Aug. 24, 1943.                W. S. ROBESON                    2,327,819
                           SELF-ADJUSTING BRAKE
                           Filed Oct. 9, 1941                2 Sheets-Sheet 1
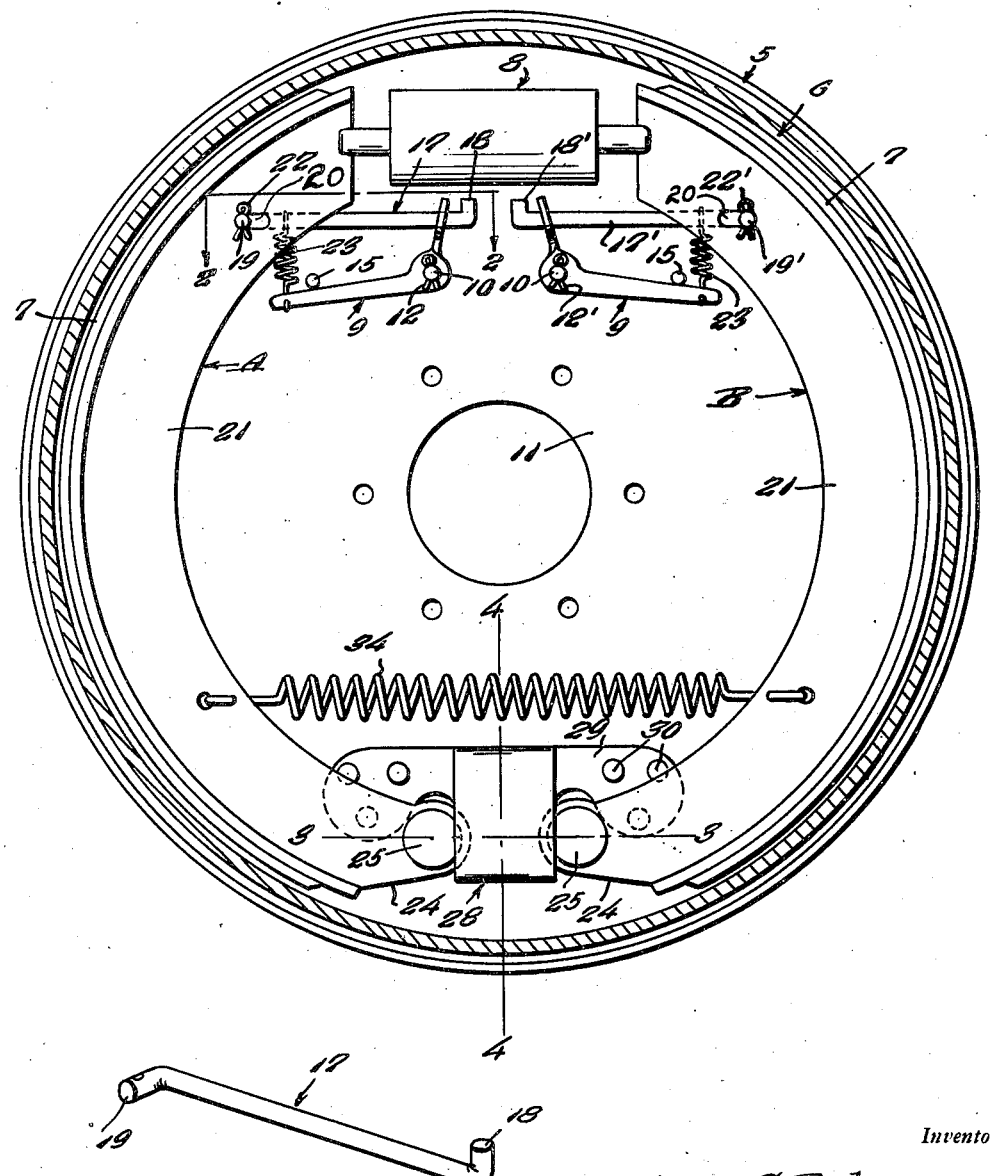
Inventor
William S. Robeson
By Clarence A. O'Brien
Attorney Aug. 24, 1943.  W. S. ROBESON  2,327,819
SELF-ADJUSTING BRAKE
Filed Oct. 9, 1941  2 Sheets-Sheet 2
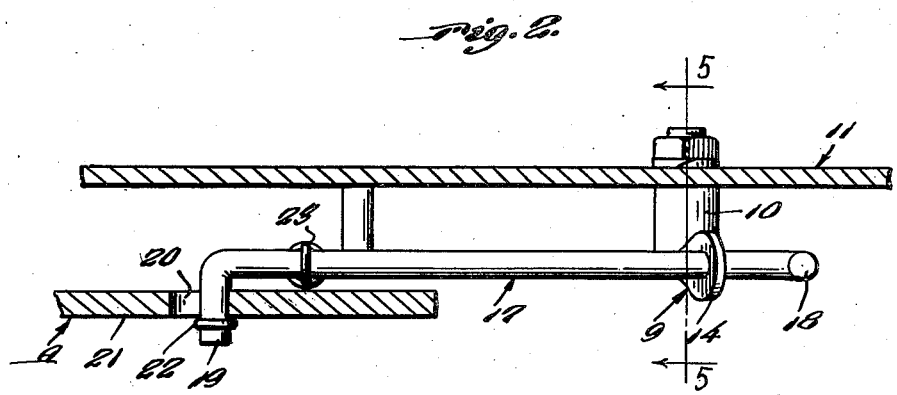
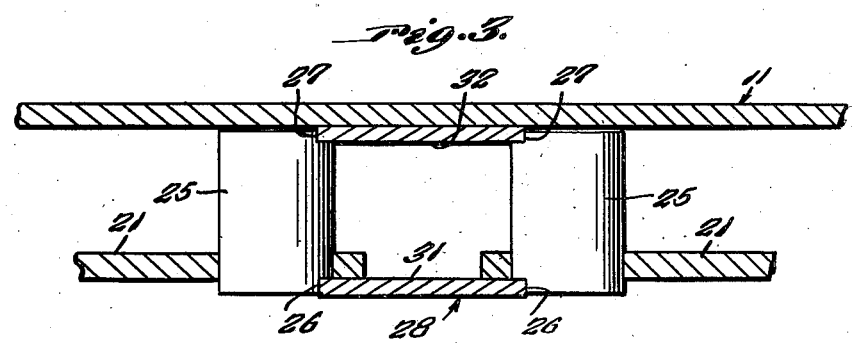
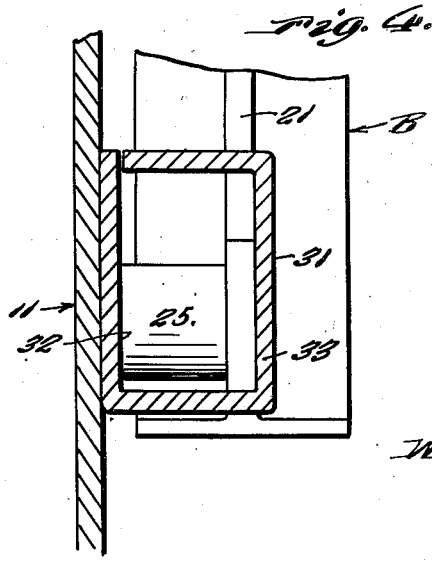
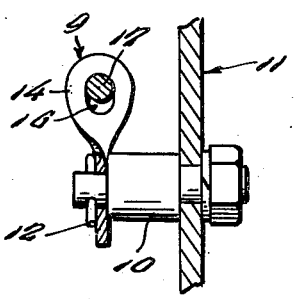
Inventor
William S. Robeson
By Clarence A. O'Brien
Attorney Patented Aug. 24, 1943

2,327,819

UNITED STATES PATENT OFFICE 2,327,819

SELF-ADJUSTING BRAKE

William S. Robeson, Detroit, Mich.

Application October 9, 1941, Serial No. 414,344

3 Claims. (Cl. 188—79.5)

My invention relates to an automatically operating, self-adjusting hydraulic wheel brake, wherein automatic adjustment of both brake shoes takes place automatically as a consequence of wear on the brake lining and on the drum, so that until the brake lining has been substantially completely worn down, the brake is constantly in perfect adjustment, and the primary object of my invention is to provide a simple and efficient arrangement of this character.

Another important object of my invention is to provide a simplified arrangement and mounting of the brake shoes, whereby no tools are required for the removal and replacement of the shoes in the brake assembly, and whereby the shoes are maintained constantly in adjustment as to position, in accordance with the state of wear of the brake lining.

Other important objects and advantages of my invention will be apparent from a reading of the following description taken in connection with the appended drawings, wherein for purposes of illustration I have shown a preferred embodiment of my invention.

In the drawings—

Figure 1 is a general sectional elevational view taken through a brake drum and showing the arrangement of the shoes and adjusting mechanisms.

Figure 2 is an enlarged fragmentary horizontal sectional view taken along the line 2—2 of Figure 1 and looking downwardly in the direction of the arrow.

Figure 3 is a similarly enlarged horizontal fragmentary sectional view taken through Figure 1 along the line 3—3.

Figure 4 is a similarly enlarged fragmentary vertical transverse sectional view taken through Figure 1 approximately on the line 4—4.

Figure 5 is a similarly enlarged fragmentary vertical transverse sectional view taken along the line 5—5 of Figure 2 looking toward the right in the direction of the arrows.

Figure 6 is a perspective view of one of the adjusting bars.

Referring in detail to the drawings, the numeral 5 generally designates the brake housing within which is positioned the brake drum 6 against the inner side of which operate the brake linings 7 of the respective brake shoes A and B which are operatively connected at their upper ends by the wheel cylinder 8 in a conventional manner.

In accordance with the present invention there is provided for each brake shoe an automatic take-up, each consisting of a recumbent L-shaped latch 9 pivoted at its elbow at a point below the adjacent end of the wheel cylinder 8, the pivot 10 being in the form of a bolt anchored in the backing plate 11 of the brake housing and provided with a cotter key 12 to hold the latch in place. The bolt 10 passes through the juncture of the standard portion 13 and the foot portion 14 of the latch 9, the latter being in the form of a flat bar bent to provide the foot 14 at right angles to the standard portion 13. A hole 15 is provided in the backing plate 11 to enable reaching the latch 9 with a suitable tool when it is desired to remove the brake shoes. Slidable through the elliptical opening 16 and the foot portion 14 of one of the latches is the adjusting bar 17 which is of round stock and is straight except for an upwardly deflected terminal 18 on its right hand end and a laterally directed terminal 19 on its left hand end. The adjusting bar 17' of the companion take-up is the same in construction as the bar 17 but reversed to bring the cotter 22' in front of the brake shoe fin, the same as cotter key 22 to enable reaching either cotter key with the same facility. As shown in Figure 1 of the drawings the laterally inward terminal 18 of the adjusting bars are located laterally inwardly from the foot portions of the latches 9, while the terminals 19 project forwardly through horizontally elongated slots 20 formed in the brake shoe fins 21 of the brake shoes A and B. Cotter pins 22 and 22' hold the terminal 20 of the bars 17 and 17' pivotally and slidably in place in the slots 20. Short contractile springs 23 are stretched between the adjusting bars 17 and 17' to which they are anchored, and the laterally outward end of the standard portion of the latches 9 to which they are also secured. The action of the spring 23 in each case is to keep the edges of the opening 16 in the foot portion of the latch biting into the surface of the corresponding adjusting bar so as to prevent unwanted longitudinal movement of the adjusting bar relative to the latch for a purpose to be explained.

The lower ends of the fins of the brake shoes have the lower edges thereof tapered as indicated by the numerals 24, and pins 25 are centered in the rounded terminals of the fins of the brake shoes.

The pins 25 which turn in the fins of the brake shoes have the opposite end portions thereof cut away as indicated by the numerals 26 and 27 for a purpose to be presently seen.

For assembling the pins and the lower ends of the brake in operative relation the anchor assembly which is generally designated 28 is provided. This consists of a flat horizontally elongated bar 29 providing terminal ears through which fastening means 30 pass to secure the bar to the backing plate 11, the middle portion of the bar having a relatively wide U-shaped portion 31 which forms a rectangular boxing into the open ends of which extend the rounded terminals of the fins of the brake shoes and the pins 25, with the cut out portions 26 and 27 bearing respectively against the lateral edges of the depending portion 32 of the bar 29 and the edges of the opposite wall 33 of the boxing. By means of this arrangement the pins and consequently the terminals of the brake shoes are free to rise and fall in the boxing without lateral displacement from the boxing, so that these portions of the brake shoes are accurately confined in accordance with brake shoe action and clearances, all clearances in the present device being subject to advance determination in accordance with the size and arrangement of the brake assembly and the thickness of the brake lining employed therein.

Assuming the parts in the relationship shown in Figure 1 of the drawings, with a relatively new brake lining 7 on the shoes A and B, ensuing wear on the brake lining will permit the brake shoes to spread wider and more closely approach the opposite sides of the brake drum 6, under the force exerted by the wheel cylinder 8. When the shoe A moves toward the left in the action necessary to engage its lining with the interior of the brake drum, the adjusting rod 17 is pulled toward the left in amount necessary to compensate for the degree of wear in the brake lining and the interior of the brake drum. When this movement of the adjusting bar 17 occurs it slides through the opening 16 in the latch the required amount and when the brakes are released the action of the latch 9 under the impetus of the spring 23 causes the edges of the opening 16 to bite into the bar 17 in a new position and prevent the bar 17 from ever returning inwardly from this new position, thereby causing the brake shoe A to occupy a new position closer to the brake drum. The brake shoe is allowed to move to follow the contour of the brake drum in its new position by the freedom provided by the anchor assembly 28 because of which the pins 25 bearing against the terminal ends of the brake shoes can move upwardly in accommodation to the change of position of the brake shoes A and B, and then jam against the edges of the boxing and hold the newly adjusted position by virtue of the force exerted by the releasing spring 34 which is stretched between the lower portions of the brake shoes A and B above the assembly 28. The action of the other take-up with respect to the brake shoe 3 is similar.

Due to the simplicity and reduction in number of parts involved in the present invention, and the fact that all parts of both take-ups are the same except the bars 17, the cost of manufacture and of servicing of brakes of the type described is substantially reduced, aside from the fact that the arrangements eliminate the necessity for periodical adjustment of the brakes during the life of the brake lining. When the lining has been worn down to the point requiring replacement, the shoes A and B can be very easily removed and relined and restored to position, or completely replaced by new shoes, without the use of any special tools.

When the brake linings of the shoes finally wear down to the point of requiring replacement, then and then only does the brake pedal operate as a warning to the driver of the need for replacing the brake linings, in that up to this point the automatic adjusting action of the brakes has maintained a high pedal. However, when the relining point is reached, the operator can tell this by the fact that the brake pedal subsides below the normal high point, this taking place because the adjusting bar 17 has reached the final position of adjustment and no further movement thereof toward the left can be achieved.

Although I have shown and described herein a preferred embodiment of my invention, it is to be definitely understood that I do not wish to limit the application of my invention thereto, except as may be required by the scope of the subjoined claims.

Having described the invention, what is claimed as new is:

1. An automatic self-adjusting hydraulic wheel brake of the type involving a brake drum including a backing plate, a pair of lined brake shoes mounted at their lower ends for movement toward and away from the radially inward surface of said brake drum, and a wheel cylinder operatively connected between the upper ends of the brake shoes, an open ended boxing secured to said backing plate between the lower ends of the brake shoes, pins journaled in said lower ends, said pins having buttress portions slidable along the ends of the boxing toward the center of the wheel as the brake lining and the surface of the brake drum wear, a shoe retracting spring stretched between lower portions of said brake shoes, said retracting spring also acting to jam said buttress portions in new positions along the ends of the boxing as the shoes move further upwardly and outwardly toward conformance with the brake drum, and automatic adjustment means active to prevent the brake shoes from returning to their original positions beyond an amount sufficient to permit release of the brake shoes from the working surface of the brake drum.

2. A wheel brake according to claim 1 wherein said adjustment means comprises an adjusting bar having pin and slot connection to the upper part of one of the brake shoes and extending in a direction toward the other brake shoe, said pin and slot connection determining the amount of inward release action of the brake shoe, and a spring operated latch pivoted on said backing plate, said latch having an element engaging said adjusting bar to prevent the same from retreating away from any new position attained by the adjusting bar in compensatory departure of the brake shoe from its original position, whereby the brake shoe upon release operates the next time from a position closer to braking surface of the brake drum.

3. Brake mechanism of the character described comprising shoes applicable through movement away from each other, rods connected to the shoes and relative to which the shoes can move to determine the extent of the released movement of the shoes toward each other, arms preventing movement of the rods toward each other, said arms being slip connected to said rods to permit outward movement of the rods relative to the arms to automatically compensate for wear of the shoes, said arms being pivotally supported in upwardly converging relation, spring means urging said arms toward each other, and stop means on the rods limiting the movement of each shoe relative to the corresponding rods to govern the released movement of the shoes, said arms having openings through which the rods pass, and levers extending along said rods in a direction toward the corresponding brake shoes, said spring means being engaged with said levers so as to exert an upward pull thereon and urge said arms toward each other whereby the arms at the edges of said openings will bite the rods.

WILLIAM S. ROBESON.